UNITED STATES PATENT OFFICE.

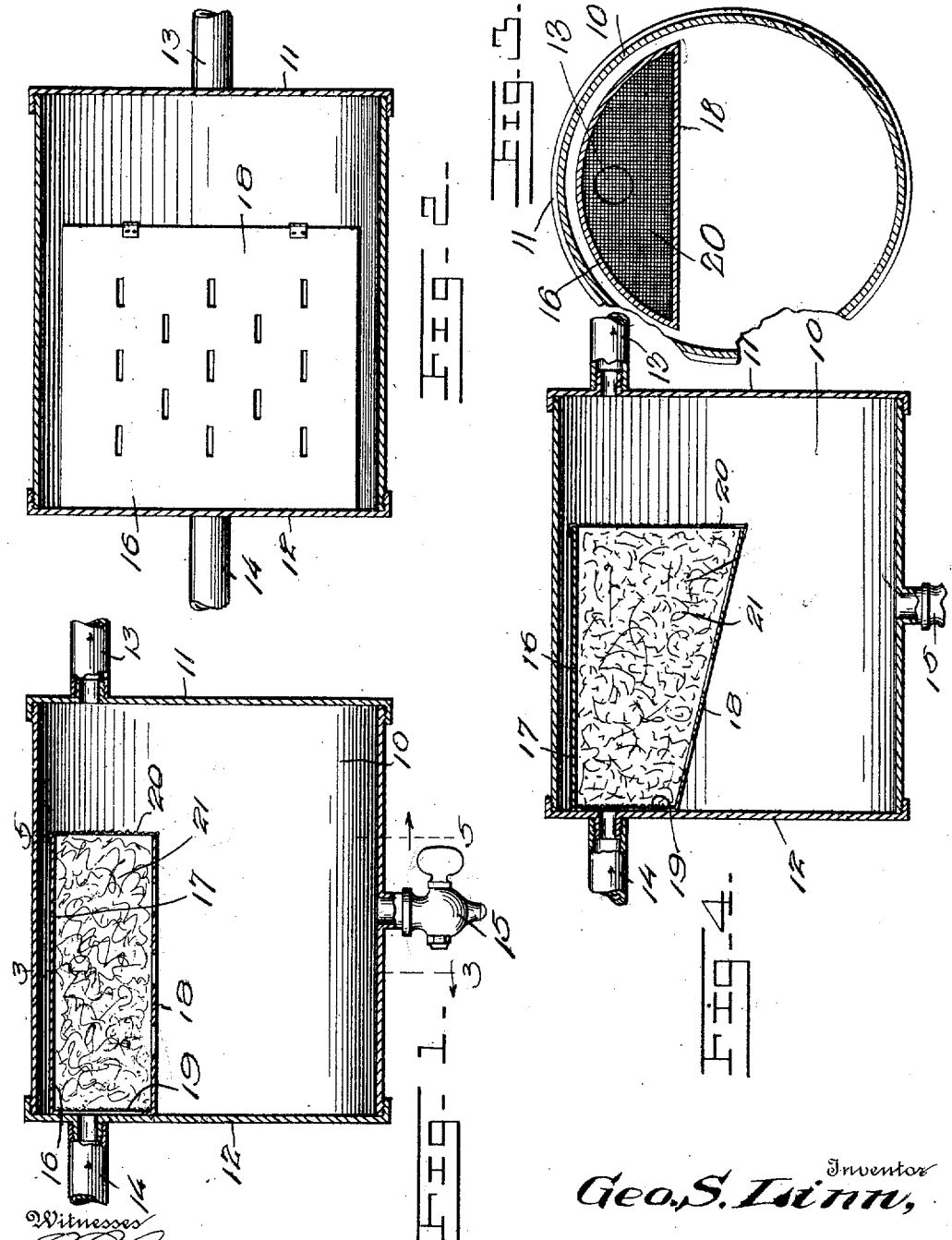

GEORGE S. LINN, OF SANTA BARBARA, CALIFORNIA, ASSIGNOR OF ONE-HALF TO EDWIN S. HICKS, OF SANTA BARBARA, CALIFORNIA.

GAS-FILTER.

975,262.      Specification of Letters Patent.      Patented Nov. 8, 1910.

Application filed April 6, 1910. Serial No. 553,780.

*To all whom it may concern:*

Be it known that I, GEORGE S. LINN, a citizen of the United States, residing at Santa Barbara, in the county of Santa Barbara and State of California, have invented certain new and useful Improvements in Gas-Filters, of which the following is a specification.

This invention relates to devices for filtering gas, and has for its object to provide such a device which is adaptable for use in purifying either acetylene or illuminating gas formed from coal.

It has for its object to provide such a device which is adapted to separate liquid from gas as well as to remove particles of matter suspended therein.

An important object of the invention is to provide a separator arranged to accumulate liquid separated from the gas in such a way that it may be drawn off while the device is in use without impairing its operation.

A further important object is to provide a novel form of strainer device so constructed as to allow the escape of liquid collected thereby.

A further object is to provide such a device which will occupy a minimum amount of space, and may be applied to use upon motor vehicles equipped with acetylene generators, or may be incorporated in gas lighting systems of houses, requiring only to be made in the proper sizes for these various uses.

Other objects and advantages will be apparent from the following description, and it will be understood that changes in the specific structure shown and described may be made within the scope of the claim without departing from the spirit of the invention.

In the drawings: Figure 1 is a vertical longitudinal sectional view through the device, Fig. 2 is a horizontal sectional view centrally of the device, looking upwardly, Fig. 3 is a cross section on the line 5—5 of Fig. 1, looking toward the outlet end, the outer casing being partly broken away, Fig. 4 is a longitudinal sectional view of a modification of the strainer casing.

Referring to the drawings, there is shown a cylindrical receptacle 10 disposed on a horizontal axis and having the heads 11 and 12 at opposite ends, provided with intake and exit tubes 14 and 13 respectively, and provided with a suitable drain cock 15 at its lower side, as shown. The inlet pipe may be disposed at a point in the head 12, but the outlet pipe 13 is preferably disposed adjacent the upper side of the device, and the adjacent head 12 is made detachable in any suitable manner, as shown being threaded upon the receptacle 10. Carried by the head 12 there is a suitable strainer casing 16, segmental in cross section and having an arcuate upper wall 17 and disposed closely adjacent the cylindrical wall of the receptacle 10 and concentric therewith and a connected plane lower wall 18. One end of this strainer casing is secured to the head 12, circumscribing the point of entrance of the inlet pipe 14, and carried within the casing a spaced distance from the head 12, there is a suitable screen 19, and hingedly secured to the opposite end edge of the floor 18 of the strainer casing, there is a similar screen 20 conforming to the shape of the casing and adapted to fit snugly against the arcuate upper wall thereof. The strainer casing projects over only a portion of the length of the casing 10, and is filled with a suitable fibrous or permeable material 21 such as cotton or wool the screen 20 being closed thereover, as shown. The floor 18 of the strainer casing is perforated, and when in use any moisture accumulating in the material 21 will naturally gravitate to the lower portion thereof and escape through the openings in the floor 18, being collected in the large space in the receptacle beneath the strainer casing.

In use, the intake tube 14 is connected in any suitable manner with a source of supply, while gas is conducted from the device through the tube 13 to the point of use by any suitable piping system. When it is desired to drain the casing, whether the device is in use or not, the cock 15 may be opened, and if the gas is being supplied under pressure the escape of any fluid in the receptacle will be more rapidly accomplished. When the material 21 in the strainer casing has become fouled, and it is desired to renew the same, the head 12 supporting the casing is removed, together with the casing the strainer or screen 20 is opened outwardly, and the material 21 removed from therein. Fresh material is introduced, and the reverse operation followed in replacing the casing.

It will be seen from the foregoing that there has been provided an extremely simple gas strainer adapted to be manufactured at an extremely low cost and applicable to use with either acetylene or ordinary illuminating gas, upon stationary or portable systems.

The operation of the device is extremely simple, and readily understood by inexperienced persons and is liable in a minimum degree to derangement by handling of inexperienced persons.

In Fig. 6 there is shown a longitudinal sectional view of a modified form of the device in which the strainer casing is enlarged at its inner end, the floor 18 being inclined downwardly from the point of support on the head 12, this construction facilitating the drainage of moisture collected to the lower sides of the strainer casing for escape therefrom; the permeable material 21 adjacent the inner end of the casing may become saturated with moisture to a greater extent than that nearer the escape openings, offering more resistance to passage of the gas, and causing such moisture to be drawn inward in the casing. By enlarging the casing toward its inner end, a larger straining surface is presented whereby tendency of the moisture to be pressed inward is greatly reduced and escape facilitated, as will be readily appreciated.

What is claimed is:

In a device of the class described, the combination with a cylindrical casing disposed on a horizontal axis and having drain openings at its lower side, of closing heads at opposite ends thereof, inlet and outlet pipes leading respectively from the heads, one of said heads having upon the inner side thereof circumscribing the outlet pipe a transversely segmental strainer casing having a plane floor and arcuate upper wall concentric with the wall of the cylindrical casing, the inner end of said strainer casing being disposed intermediately of the cylindrical receptacle, a screen member carried across said strainer casing spaced from the supporting heads, a second screen hinged to the opposite end of the strainer casing and adapted to close said ends, said plane floor having perforations therethrough and permeable material carried in the casing for collection of moisture in gases passing therethrough for drainage by gravity through the openings in said floor.

In testimony whereof I affix my signature, in presence of two witnesses.

GEORGE S. LINN.

Witnesses:
Wm. Poole,
S. M. Barber.